United States Patent
Coombes et al.

(10) Patent No.: US 10,917,254 B2
(45) Date of Patent: Feb. 9, 2021

(54) SYSTEM AND METHOD OF UTILIZING AN INTERFERENCE MITIGATING PROTOCOL IN MESH NETWORKS

(71) Applicant: Gooee Limited, St Albans (GB)

(72) Inventors: Simon Coombes, St Petersburg, FL (US); Shmuel Silverman, Novato, CA (US)

(73) Assignee: Gooee Limited, St Albans (GB)

( * ) Notice: Subject to any disclaimer, the term of this patent is extended or adjusted under 35 U.S.C. 154(b) by 0 days.

(21) Appl. No.: 16/264,915

(22) Filed: Feb. 1, 2019

(65) Prior Publication Data
US 2019/0245707 A1 Aug. 8, 2019

Related U.S. Application Data

(60) Provisional application No. 62/627,215, filed on Feb. 7, 2018.

(51) Int. Cl.
| | |
|---|---|
| *H04L 12/12* | (2006.01) |
| *H04L 12/751* | (2013.01) |
| *H04L 12/28* | (2006.01) |
| *H04W 40/28* | (2009.01) |
| *H04L 12/44* | (2006.01) |
| *H04L 12/913* | (2013.01) |
| *H04L 12/721* | (2013.01) |
| *H04W 84/18* | (2009.01) |

(52) U.S. Cl.
CPC .......... *H04L 12/12* (2013.01); *H04L 12/2838* (2013.01); *H04L 45/02* (2013.01); *H04W 40/28* (2013.01); *H04L 12/44* (2013.01); *H04L 45/34* (2013.01); *H04L 47/724* (2013.01); *H04W 84/18* (2013.01)

(58) Field of Classification Search
CPC .......... H04L 12/12; H04L 45/02; H04L 12/44
See application file for complete search history.

(56) References Cited

U.S. PATENT DOCUMENTS

| | | | |
|---|---|---|---|
| 6,549,513 B1 * | 4/2003 | Chao | H04L 45/00 370/227 |
| 8,085,792 B1 | 12/2011 | Aly | |
| 8,160,096 B1 | 4/2012 | Anburaj | |
| 9,398,568 B2 | 7/2016 | Görgen et al. | |
| 9,473,393 B2 | 10/2016 | Van Der Stok | |
| 9,565,065 B2 | 2/2017 | Kelsey | |

(Continued)

FOREIGN PATENT DOCUMENTS

EP 2094056 A1 * 8/2009 ........ H04W 52/0216

*Primary Examiner* — Hassan Kizou
*Assistant Examiner* — Abdullahi Ahmed
(74) *Attorney, Agent, or Firm* — McBee Moore & Vanik IP, LLC

(57) ABSTRACT

A system and method for implementing a dynamic interference mitigating protocol in a mesh network is described. The system includes a first of a plurality of nodes in a mesh network to function as an originator station, a second of the plurality of nodes in the mesh network to function as a target station and a third of the plurality of nodes in the mesh network to function as a coordinating node. A setup message may be transmitted across the plurality of nodes to determine or implement an assigned path between the originator station and the target station. All nodes in the plurality of nodes may be reactivated after the high density data packets are received at the target station.

14 Claims, 9 Drawing Sheets

(56) References Cited

U.S. PATENT DOCUMENTS

| | | | |
|---|---|---|---|
| 2003/0084367 A1* | 5/2003 | Suemura | H04L 12/437 714/4.11 |
| 2004/0264422 A1* | 12/2004 | Calcev | H04L 45/26 370/338 |
| 2007/0097945 A1* | 5/2007 | Wang | H04L 45/12 370/349 |
| 2007/0161352 A1* | 7/2007 | Dobrowski | H04L 41/12 455/69 |
| 2007/0214280 A1 | 9/2007 | Patel et al. | |
| 2008/0170550 A1 | 7/2008 | Liu et al. | |
| 2009/0073921 A1* | 3/2009 | Ji | H04L 45/00 370/328 |
| 2009/0175324 A1* | 7/2009 | Sampath | H04L 5/0007 375/222 |
| 2009/0268677 A1 | 10/2009 | Chou et al. | |
| 2010/0195649 A1* | 8/2010 | Miyata | H04L 12/42 370/390 |
| 2011/0210816 A1 | 9/2011 | Wang | |
| 2011/0216762 A1* | 9/2011 | Nas | H04L 12/66 370/352 |
| 2013/0215739 A1* | 8/2013 | Zhang | H04W 40/14 370/228 |
| 2014/0112126 A1 | 4/2014 | Claessens et al. | |
| 2015/0055490 A1* | 2/2015 | Patil | H04W 24/08 370/252 |
| 2015/0188949 A1* | 7/2015 | Mahaffey | H04L 63/20 726/1 |
| 2015/0207749 A1 | 7/2015 | Cao et al. | |
| 2015/0305036 A1* | 10/2015 | Lee | H04L 5/001 370/329 |
| 2016/0007185 A1 | 1/2016 | Zhu et al. | |
| 2016/0014015 A1* | 1/2016 | Mangin | H04L 45/22 370/218 |
| 2016/0037736 A1* | 2/2016 | Rainone | A01G 25/16 700/284 |
| 2016/0127168 A1* | 5/2016 | Ramalingam | H04L 41/0654 370/216 |
| 2017/0111186 A1* | 4/2017 | Tochio | H04L 12/465 |
| 2018/0091407 A1 | 3/2018 | Tervonen et al. | |
| 2018/0109439 A1* | 4/2018 | Chen | H04L 45/124 |
| 2018/0131599 A1* | 5/2018 | Dimitriadis | H04L 45/22 |
| 2018/0152406 A1 | 5/2018 | Kuo et al. | |
| 2018/0220283 A1 | 8/2018 | Condeixa et al. | |
| 2018/0376317 A1 | 12/2018 | Kim | |
| 2019/0124489 A1* | 4/2019 | Ahmad | H04W 4/70 |

* cited by examiner

Fully Connected Mesh Network
(Prior Art)

Partially Connected Mesh Network

SYSTEM AND METHOD OF UTILIZING AN INTERFERENCE MITIGATING PROTOCOL IN MESH NETWORKS

CROSS-REFERENCE TO RELATED APPLICATIONS

This application claims the benefit of U.S. Provisional Patent Application No. 62/627,215 filed Feb. 7, 2018, the entire contents of which are incorporated herein by reference.

FIELD

The present embodiments relate to a mesh network incorporated in any type of wired or wireless network system. More particularly, the present embodiments relate to a system and method of implementing an interference mitigating protocol in the mesh network to support a wide-variety of applications.

BACKGROUND

In communication networks, a node is either a redistribution point (e.g. data communication equipment) or a communication endpoint (e.g. data terminal equipment). A mesh network is a local network topology in which infrastructure nodes (i.e. bridges, switches and other infrastructure devices) connect directly, dynamically and non-hierarchically to as many other nodes as possible and cooperate with one another to efficiently route data from/to clients. In a fully connected mesh network, such as network 210 illustrated in FIG. 2, every node may be interconnected. The simplest fully connected network is a two-node network. In a partially connected network, such as network 220 illustrated in FIG. 2, certain nodes may be connected to exactly one other node while other nodes are connected to two or more other nodes via a point-to-point link. This may make it possible to make use of some of the redundancy of mesh topology that is physically fully connected, without the expense and complexity required for a connection between every node in the network. Mesh networks are growing in size as industrial, lighting, smart home and other IoT applications are taking advantage of them with multitudes of sensors and other devices.

BLUETOOTH mesh networks are one such network type. These networks make use of messages called heartbeats that are transmitted by nodes periodically. A heartbeat message may indicate to other nodes in the network that the node sending the heartbeat is still active. In addition, heartbeat messages may contain data which may allow receiving nodes to determine how far away a sender is in terms of a number of hops required to reach the sender. The use of heartbeat messages may be associated with a time to live (TTL) field within a network packet. TTL may control a maximum number of hops over which a message will be relayed. Setting the TTL allows nodes to exercise control over relaying and conserve energy, by ensuring messages are not relayed further than is required. Furthermore each node may implement a cache that contains all recently seen messages and if a message is found to be in the cache this is an indication that the node has seen and processed the message.

Deploying large density mesh networks inevitably leads to an increase in interference, as sensor nodes and other nodes are constantly sending messages across the network. In large density mesh networks, data packets may travel through and hop across many intermediate nodes. For example, data may have to hop more than ten or more nodes to reach a destination. For every hop in the mesh network, a transfer speed of a data packet transfer may be significantly lessened. If the data packet originated from a high bandwidth application or originator station, a transmission time to reach the target station may be severely diminished. Applications may need higher bandwidth for short periods of time but with varying frequency of occurrence. For example, when sending video data, which requires a high frame rate, a mesh network by its very nature may make it difficult to prioritize messages getting through the network due to the competing messages broadcasting through the network. Furthermore, as mesh networks grow in size and are deployed in a relatively close space, there is a substantial increase in a likelihood that interference or collisions will result in message communication failure.

Accordingly, there exists a need for a system and method of implementing a protocol in a mesh network to facilitate high speed transmission of a message through the network for avoiding interference and collisions that are common in such prior art networks.

BRIEF DESCRIPTION

According to some embodiments a system for implementing a dynamic interference mitigating protocol in a mesh network is described herein. The system comprises a first of a plurality of nodes in a mesh network to function as an originator station, a second of the plurality of nodes in the mesh network to function as a target station and a third of the plurality of nodes in the mesh network to function as a coordinating node. A setup message may be transmitted across the plurality of nodes to determine or implement an assigned path between the originator station and the target station. The setup message may comprise a hop-by-hop route ID from the originator station to the target station to initiate an interference mitigating protocol by each of the plurality of nodes such that incoming messages to nodes associated with the assigned path will be truncated after being received. High density data packets may be transmitted from the originator station to the target station via the assigned path using a dynamic tunneling protocol where the dynamic tunneling protocol activates the specific nodes in the assigned path and inactivates the remaining nodes of the plurality of nodes until the high density data packets are received by the target station. All nodes in the plurality of nodes are reactivated after the high density data packets are received at the target station.

According to some embodiments, a method for implementing a dynamic interference mitigating protocol in a mesh network is disclosed. The method comprises identifying high density data packets to be transmitted from a first of a plurality of nodes in a mesh network that functions as an originator station to a second of the plurality of nodes in the mesh network that functions as a target station. A setup message is generated across the plurality of nodes to activate a path wherein the setup message includes a hop by hop route ID through the plurality of nodes. A tunneling network protocol may be initiated after receiving the setup message at an application node that indicates that incoming messages to nodes associated with the assigned path will be truncated after every hop through the mesh network. High density data packets may be transferred via the activated path using a dynamic interference mitigating protocol, where nodes of the plurality of nodes that are associated with the path are activated and all remaining nodes of the plurality of nodes are inactivated. All of the plurality of nodes may be reactivated after the high density data packets are received by the target station.

According to some embodiments, a method for implementing a dynamic interference mitigating protocol in a mesh network. The method comprises generating a message that includes a fast path identifier associated with a source node in a mesh network comprising a plurality of nodes. The fast path identifier resides in a message header that includes a list of forwarding nodes in the mesh network. The message may be broadcast through the mesh network. Nodes in the plurality of nodes other than the source node, the receiving node and the forwarding nodes indicated in the message may be deactivated. The list of the forwarding nodes may be truncated from the message once the message is forwarded to a next forwarding node in the mesh network. All nodes in the plurality of nodes are reactivated after the message is received at the receiving node. These and other advantages will be apparent from the present application of the embodiments described herein.

BRIEF DESCRIPTION OF THE DRAWINGS

The above and still further features and advantages of embodiments of the present disclosure will become apparent upon consideration of the following detailed description of embodiments thereof, especially when taken in conjunction with the accompanying drawings, and wherein.

Figure 1:
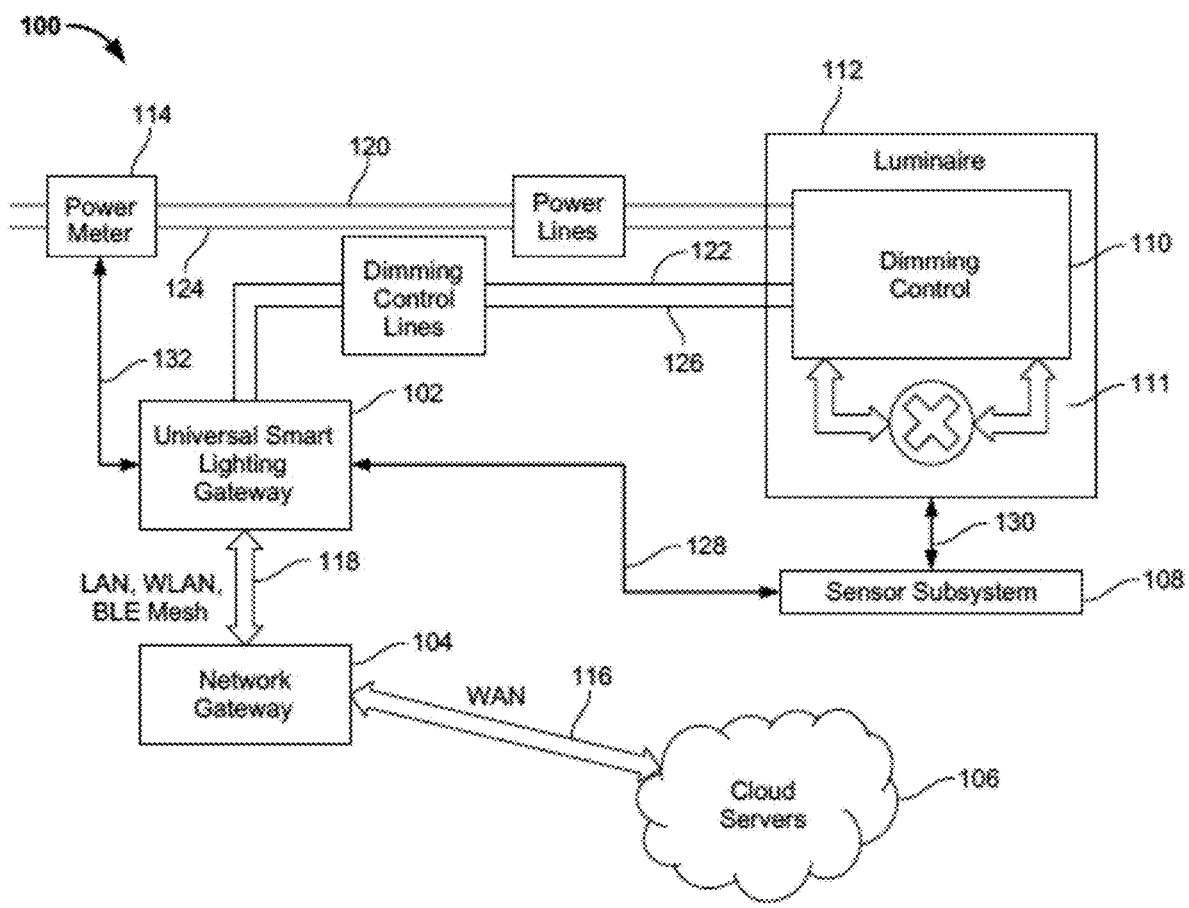
FIG. 1 is a fully connected mesh network high level system diagram of a luminaire IoT network which may be implemented in any wired or wireless or light communication mesh network system.
Figure 2:
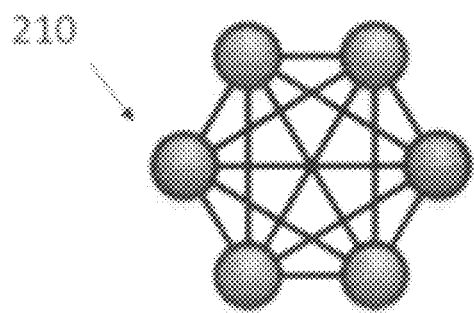
FIG. 2 is a logical topology diagram of a fully and partially connected mesh network which may be implemented in any wired or wireless or light communication network system.
Figure 2:
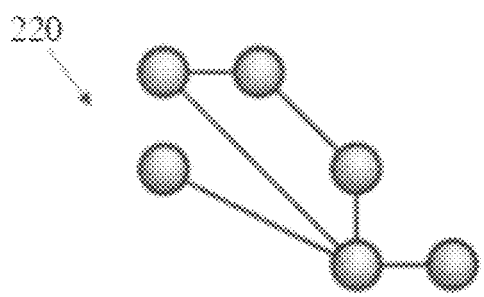

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to be used to limit the scope of the description or the claims. To facilitate understanding, reference numerals have been used, where possible, to designate like elements common to the figures.

DETAILED DESCRIPTION

Embodiments described herein relate generally to a mesh network incorporated in any type of wired or wireless network or light communication network system. More particularly, the present embodiments relate to a system and method for implementing or initiating an interference mitigating protocol in the mesh network. Embodiments described herein will be illustrated below in conjunction with a mesh network incorporated in the luminaire IoT network system. However, the embodiments of the system and method may be implemented in any type of wired or wireless or light communication (VLC/DLC) network system.

The term "module" as used herein may refer to any known or later developed hardware, software, firmware, artificial intelligence, fuzzy logic, or combination of hardware and software that is capable of performing the functionality associated with that element. Also, while the present disclosure may be described in terms of exemplary embodiments, it should be appreciated those individual aspects of the embodiments described herein may be separately claimed.

The term "computer-readable medium" as used herein refers to any tangible storage and/or transmission medium that participate in storing and/or providing instructions to a processor for execution. Such a medium may take many forms, including but not limited to nonvolatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other non-transitory medium, magneto optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to email or other self-contained information archive or set of archives may be considered a distribution medium equivalent to a tangible storage medium. When the computer-readable media is configured as a database, it may be understood that the database may be any type of database, such as relational, hierarchical, object-oriented, and/or the like. Further, while reference is made to various types of databases, it may be understood by one of ordinary skill in the art that all of the database functions may be stored within compartments of a single database, or within individual databases. In any event, the present specification may be considered to include a tangible storage medium or distribution medium and prior art-recognized equivalents and successor media, in which the software implementations of the present disclosure are stored.

Now referring to FIG. 1, a system 100 relates to control of luminaire driver and/or LED driver behavior by using a single variable in IoT system. In some embodiments, the system may include at least one of a plurality of luminaires 112 and/or a plurality of LEDs 111 configured to communicate with at least one gateway 102, at least one single variable to control the luminaire driver and/or LED driver behavior, at least one sensor subsystem 108 configured to sense a plurality of color channels and monitor at least one change in environment in real time, at least one power meter 114 configured to measure power in real time, at least one dimming control protocol or dimming controller device or driver or interface 110 installed in a plurality of lighting devices and for controlling a plurality of dimming levels of the plurality of lighting devices, and at least one server 106. Each of the plurality of luminaires 112 and/or LEDs 111 may include at least one driver and/or LED driver. Further, each of the plurality of luminaires and/or LEDs may comprise an inbuilt power source where the power source may include at least one of plurality of rechargeable batteries. The at least one sensor subsystem 108 and the at least one power meter 114 may be connected with the at least one gateway 102 along with the plurality of luminaires 112. The at least one sensor subsystem 108 may include at least two sets of sensors. A first set of the at least two sets of sensors may include an environment sensor dedicated to environment sensing and may be arranged such that it faces away from and/or extends in a downwardly fashion from the luminaire. A second set of the at least two sets of sensors may include a color sensor/RGB sensor arranged such that it faces the luminaire directly. According to some embodiments, the at least one server 106 is configured to calculate and predict depreciation of the dimming levels of the plurality of luminaires and/or LEDs. The sensor may be configured to report and change display status information associated with the plurality of luminaires 112. The at least one sensor subsystem 108 may sense and capture environmental data in real time. In some embodiments, the at least one server 106 may be connected with the gateway 102 via at least one of a wired connection and a wireless or light communication network connection.

In some embodiments, the gateway 102 may be capable of discovering a dimming control protocol installed in the plurality of lighting devices and controlling the dimming levels of the plurality of lighting devices. Further, the gateway 102 may be capable of controlling power to the luminaire and may be capable of dimming the luminaire to a minimal level or shutting it off completely. According to some embodiments, the at least one server 106 may be configured to calculate and predict depreciation of the dimming levels of the plurality of luminaires 112 and/or LEDs 111. Each sensor and/or sensor system may be configured to report and change display status information associated with the plurality of luminaires. The at least one sensor subsystem 108 and the at least one power meter 114 may each be connected with the at least one gateway 102. The at least one of the plurality of luminaires 112 and the plurality of LED's 111 may be physically connected to the gateway via at least one dimming control interface.

In some embodiments, the luminaire 112 may comprise a system that includes a single luminaire or multiple luminaires connected with a single common interface to power lines 120, 124. According to some embodiments, a power meter 114 may be connected electrically between the gateway 102 and the luminaire 112 and may be connected electrically to the luminaire 112 via the power lines 120, 124. The power meter 114 may be connected to the gateway 102 via the power meter interface 132.

The power meter 114 may be connected to an input line of the luminaire 112, in such a way that the power meter 114 measures electrical power drawn by the luminaire 112 at any given moment in real-time. According to some embodiments, the power meter 114 may be connected to the gateway 102 to provide real-time power measurements correlated 1-1 to luminaire power drawn at any given moment. The interface 132 between the gateway 102 and the power meter 114 may be a Universal Asynchronous Receiver/Transmitter (UART) or other communication interface ("power meter interface"). The interface 120, 124 between the power meter device 114 and the luminaire 112 may depend on the type of power meter 114 being used.

As illustrated in FIG. 1, the at least one sensor subsystem 108 may detect information related to the system 100 and the luminaires 112 by detecting current conditions of at least one of the luminaires 112. The current conditions of the luminaires 112 may be detected such as, but not limited to, a current color level or intensity, the current temperature or voltage or humidity of the like, the current dimming level, and the like. The current condition information may be relayed to the gateway 102, which relays the information to the server 106 for storage, processing and the like. Thus, the sensor subsystem 108 may sense/detect a plurality of color channels and monitor at least one change in environment in real time. The up looking color sensor of the sensor subsystem 108 may identify an increase of fluctuation in the luminaire driver and/or LED driver or flickering. When the luminaire driver and/or LED driver fluctuates, the up looking color sensor may measure a change or disruption associated with the power supply or based on the power source. The information collected by the gateway 102 may include a current power level of the luminaires 112 as measured by the power meter 114 which may measure a current power level being used by the luminaires 112. The gateway 102 may be configured to receive information related to the plurality of luminaires 112 where the information includes the color intensity and at least one environmental condition sensed by the sensor subsystem 108. The sensor subsystem 108 may be arranged such that it connects via connection 130 to the luminaire 112 on one side and to the gateway 102 via a sensor interface 128 on another side. According to some embodiments, the connection 130 to the luminaire 112 may comprise a physical connection and may not limited to a specific location. The location of the sensor subsystem 108 may be different for various types of sensors that are to be positioned.

The gateway 102 may be capable of communicating and handling the plurality of sensors and sensor protocols via its sensor interface 128. Embodiments in accordance with the present disclosure do not limit the type of hardware/wire/bus interfaces between the gateway 102 and the sensor subsystem 108, e.g., the number of wires, the type of wires or bus connectors. In some embodiments, the connections may be as simple as analog interface connectors and/or electrical/digital bus connectors of any kind.

The sensor or combination of sensors may measure multiple color channels ("color sensor") directly facing the luminaires as well as a low-resolution imaging sensor which may include an array of sensors combined into a low-resolution imaging device, or a single ASIC that is an imaging sensor ("environment sensor"). The color sensor may be used to measure both the color content of a light source and the color intensity. The color sensor can be based on a single color or a plurality of colors.

According to some embodiments, the environment sensor may be used for monitoring the information to be collected about the environment of the light source. The environment sensor may include three or more different sensors, such as, a low-resolution image sensor, an ambient light sensor, and a temperature sensor. Embodiments in accordance with the present disclosure can use other sensors and more types of sensors to characterize the environment. Without limitation, this disclosure is referring to the three sensors included in the environment sensor as an "environment sensor". Further, without limitation, the environment sensor may include less or more sensors than are described herein. To be sure, the environment sensor provided as a part of the combination of sensors, may include sufficient/enough information to measure the environment, as described in this disclosure.

According to some embodiments, the combination of the environment sensor and the color sensor, may be set into one of a single ASIC or a set of separate devices, all of which are also connected to the gateway 102. The sensors may be directed as follows: the color sensor faces the luminaires, and the environment sensor faces away from the luminaires in such a way that it monitors the environment. Real time measurements and assessments may be conveyed to the gateway 102 by the sensors that make up the sensor subsystem 108.

According to some embodiments, the environment and color sensors of the sensor subsystem 108 may be placed or connected to a fitting of the luminaire 112 and/or LED 111. An exact location of the sensors may not be fixed (e.g., two different luminaires by a same manufacturer of the same type of fitting and LED specifications may be assembled such that the sensor location is different relative to the surface and dimensions of the fitting). Thus, the location of the color and environment sensors on the fitting may not be limited.

According to some embodiments, the gateway 102 may control the dimming device 110 and change the dimming level and the color temperature of the luminaire 112 in luminaire devices that allow for color temperature control. In some embodiments, the gateway 102 may receive a set of directives or instructions for dimming setup and sensor measurements to occur at a specific day and time and/or on a specific schedule that repeats itself. According to some embodiments, the sensors of the sensor subsystem 108 may be programmed via the gateway 102 such that they will provide data only in cases where color intensity is outside a predefined range. The gateway 102 may be controlled such that it executes measurements only when environment measurements are in a certain range, as well as when the dimming level is in a certain range. According to some embodiments, the dimming parameters, the environmental reading parameters and the sensor parameters and reading setup, may all be controlled from outside of the gateway 102 via cloud servers 106 connecting to the gateway 102. A person of ordinary skill in the art may appreciate that the control described here allows the system to set up a miniature-controlled environment in which the color intensity of the luminaire 112 can be measured.

The system 100 may continuously receive real-time performance measurements from the sensor devices of the sensor subsystem 108 via the sensor interface 128 and power measurements from the power meter 114 via the power meter interface 132. According to some embodiments, the gateway 102 sends these readings in a compressed format to the cloud servers 106. According to some embodiments, the gateway 102 is configured to relay the information collected by the system to the at least one server 106 for processing, storage, calculating, compilation, comparing, and the like. According to some embodiments, the server 106 includes a processor configured to receive and use the information to calculate and predict a life expectancy of the luminaires 112 and/or LEDs 111 and to generate and relay a life expectancy report to a user. The compressed format may include two types of messages, namely a baseline message set and an updates message set. In general, and to be sure, a message set may comprise any one of the baseline message and/or set of messages and the updates message set. According to some embodiments, the baseline message set may include the full sensor readings, power level readings and current dimming state. According to some embodiments, the updates message set may include changes or differentiations from a previous message set. The baseline message set may be sent upon major change, such as a change in the dimming level, while the updates message set may be sent at regular intervals. According to some embodiments, the updates message set includes readings that are significantly different from a previous set. In one embodiment, sensor readings may be averaged over the time interval between two consequent updates message sets.

The system 100 may include a backhaul interface 118 for connecting the gateway 102 and a network gateway 104. In some embodiments, the backhaul interface 118 comprises a mesh network. In some embodiments, the backhaul interface 118 may comprise a wired or wireless Local Area Network (LAN), including one or more of Mesh Bluetooth Low Energy (Mesh BLE), Smart Mesh, Bluetooth Mesh, WLAN, ZigBee, and/or Ethernet LAN. The backhaul interface 118 may communicate via a communication protocol such as, but not limited to, a Mesh BLE protocol. The gateway 102 may be connected to the back-end network 104 via LAN, WLAN, WAN, Mesh BLE radio network or other means. This connection may allow another device on the network, local to the gateway or via WAN in the cloud, to handle the lumen prediction process. Thus, an entire luminaire half-life prediction process may be distributed between physical machines or on a single machine, local or remote to the gateway 102.

Embodiments in accordance with the present disclosure provide the system 100 that includes the gateway 102, which can interface with other control systems or devices via wired connections, Ethernet connections, wireless connections or any combination thereof, and can receive control messages that direct the gateway 102 to change a dimming level via its dimming interface/control/driver 110. This interface or plurality of interfaces comprise the backhaul interface of the gateway. Embodiments in accordance with the present disclosure provide a system in which the backhaul protocol is associated with a mesh network and is capable of delivering dimming directions to the gateway 102 as well as receiving sensor and power level readings via the sensor subsystem 108 from the gateway 102 associated with the luminaires 112 managed by this gateway 102.

According to some embodiments, the gateway 102 may be connected to the network gateway 104, which may reside between the local networks and a wide area network (WAN) 116. In some embodiments, the WAN 116 may connect the gateway 102 to cloud servers 106 for operational and management interfaces. According to some embodiments, the gateway 102 may be configured to control a plurality of dimming levels of the lighting devices and is capable of communicating sensor readings and the dimming level as well as a power reading of the luminaire 112 over the wired/wireless network(s) 118 and via the Wide Area Network ("WAN") 116 to the server 106 for processing.

Embodiments in accordance with the present disclosure provide that the cloud servers 106 may be continuously receiving performance measurements from the plurality of gateways 102. In some embodiments, the cloud servers 106 provide each gateway 102 with a table of reading directions that include the correct sensor reading thresholds for specific dimming levels associated with the specific luminaire 112.

Thus, the gateway 102 may only need to report changes or deviations from this internal table to the cloud servers 106. Using this method, the system 100 may further reduce an amount of information that needs to be transmitted over the gateway 102 backhaul interface 118. In this way, the cloud server applications may control the rate of information sent by the gateway 102 and more accurately predict the LED 111 behavior.

The system 100 may send sensor readings and other information over the backhaul interface 118 to the cloud server 106 at random times. According to some embodiments, this may allow for better utilization of the backhaul interface 118. In some embodiments, messages being sent at random time periods during the day may include a correct time stamp of the measurement or reading and the sensor reading (e.g., dimming level). Because of a delay in transmission, the message receiving time at the cloud server may not correlate with the measurements' time. Thus, tagging the measurement correctly with a time of measurement may be required. In general, the use of a mesh network as the backhaul interface and the likely numerous gateways, luminaires and sensors per gateway 102 may provide for an opportunity to implement an interference mitigating protocol to ensure more timely and successful message and data packet delivery for managing the luminaire IoT system.

Figure 3:
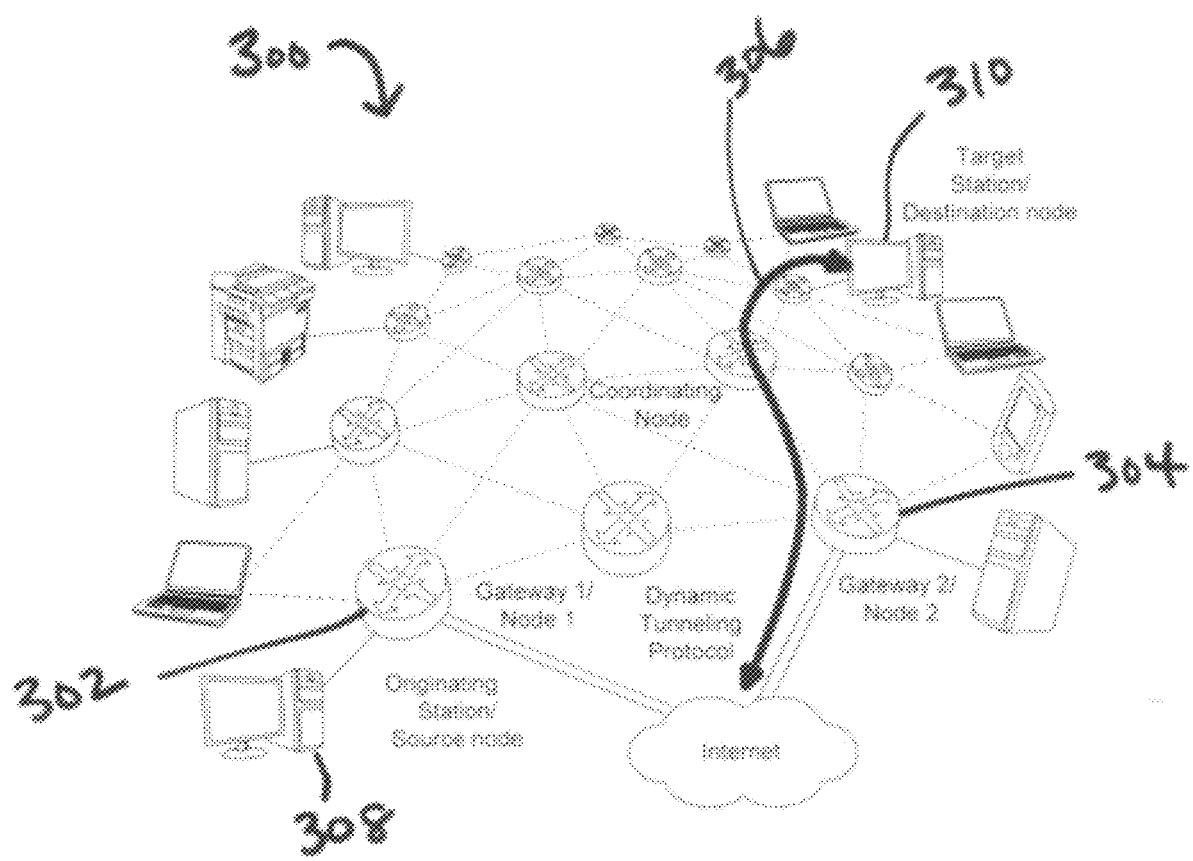
FIG. 3 is a high-level system diagram of a mesh network, using the interference mitigating protocol according to an embodiment.

FIG. 3 is a high-level system diagram of a mesh network 300 implemented in any wired or wireless or light communication network system according to an embodiment. The network 300 may comprise a LAN (e.g., IEEE 802.11), BLUETOOTH (e.g., IEEE 802.15) or other network and includes different station nodes around the periphery of the drawing. The network 300 may also include two gateway nodes (302, 304) connecting the network 300 to another network (e.g., the internet or a WLAN). In some embodiments, a system and method for identifying or determining a specific (or best) path 306 to send data packets or messages from a source node 308 to a destination target node 310 is disclosed, according to some embodiments. In one embodiment, the system comprises a gateway, at least one network server or computer connected with the gateway, and at least one interference mitigating protocol for network routing. In one embodiment, each node of the network may be configured to receive, identify and collect path information (e.g., data packets) from all other nodes on network 300 during normal network transmissions at normal rate and in an ordered sequence of receiving data packets. This may be accomplished by measuring one or more, or a combination of factors such as: 1) time of arrival of the data packets, 2) time of origination of the data packets, and 3) distance of the path from the source node 308 to the target node 310. In one embodiment, the system may be configured to identify high density data packets originating from the source node 308 intended for transmission to target node 310. The system may further be configured to assign the specific path 306 via one or more nodes to receive high density data packets from the source node 308 to the target node 310 based on the collected path information.

Figure 4:
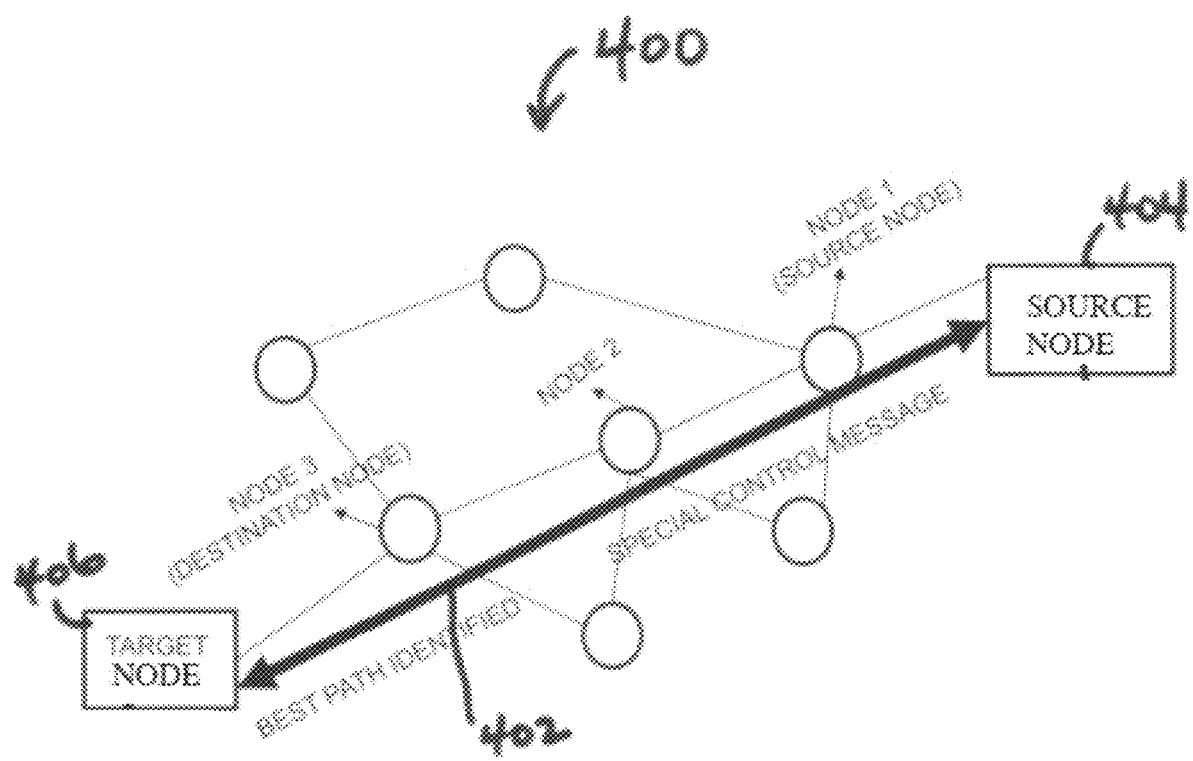
FIG. 4 is a diagram showing a best/specific path determination for transferring data packets between an originator station and a target station in the mesh network, according to an embodiment.

FIG. 4 is a diagram of an identified specific path 402 for transferring data packets between a source node (or origination station) 404 and a target node (or destination station) 406 in the mesh network 400, according to some embodiments. In this embodiment, the system may be configured to generate and transmit a special control message to the network nodes to enable, operate, or activate the identified path via specific nodes to transfer high density data packets using an interference mitigating protocol. The special control message may be sent by a source node or other node and the special control message may include a forwarding ID of the specific nodes (e.g., shown to include nodes 1, 2 and 3) in the path.

Figure 5:
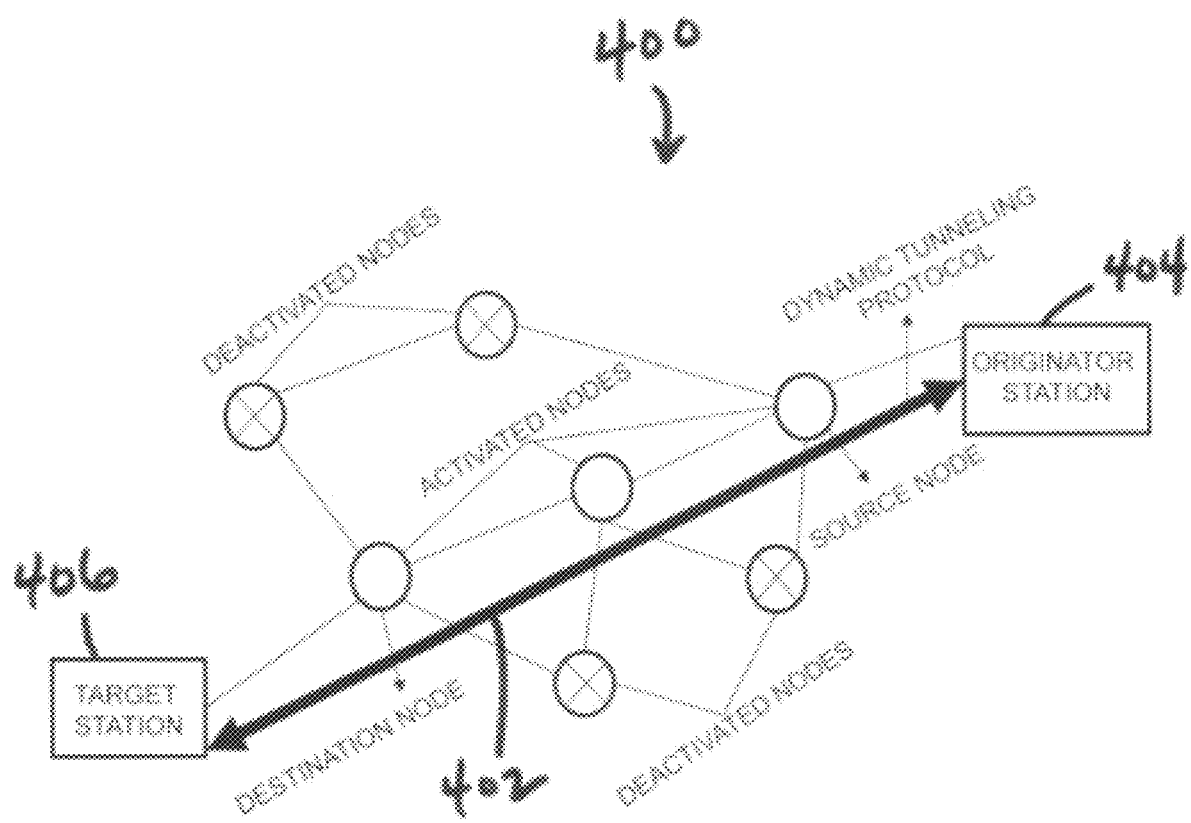
FIG. 5 is a diagram showing the initiated interference mitigating protocol via generated message for transferring data packets between an originator station to a target station in the mesh network, according to an embodiment.

FIG. 5 is a diagram of an initiated interference mitigating protocol via generated special control message for transferring data packets between the source node 404 and the target node 406 in the mesh network 400 according to some embodiment. In this embodiment, the special control message may be configured to activate the nodes (1, 2, 3) along the identified specific path 402 and to deactivate the other nodes on network 400 until the high density data packets are received by the target node. In some embodiments, inactivating or deactivating a node comprises instructing the node to receive message but to not transmit or forward any messages. Thus, in some embodiments, messages received at an inactive node are simply dropped.

Figure 6:
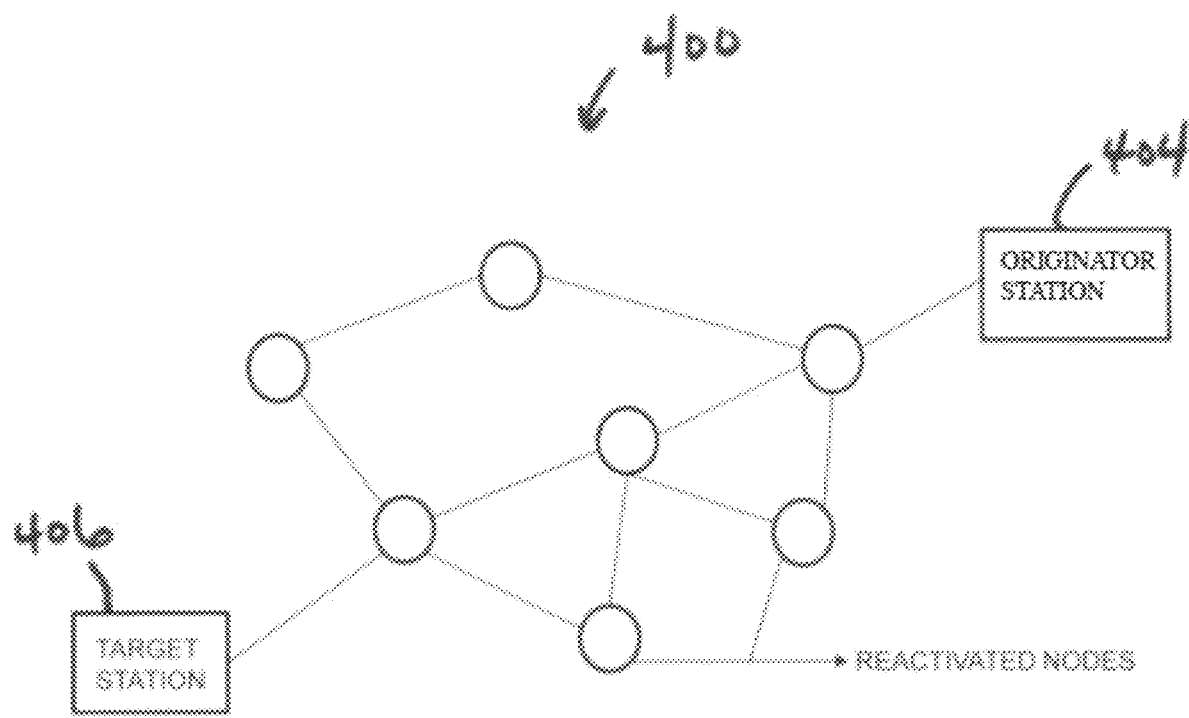
FIG. 6 is a diagram showing re-activated nodes after transferring data packets between an originator station to a target station in the mesh network, according to an embodiment.

FIG. 6 is a diagram of the network 400 after the high density data packets are finally received by the target node 406. The nodes that had been deactivated by the special control message are re-activated, according to some embodiments. At this time of re-activation, the mesh network may revert back to normal operation.

More particularly, the present embodiments relate to a system and method of implementing a dynamic tunneling protocol in a mesh network or a managed network, which has wide-variety of applications. In one example, the system may relate to a mesh network that may be incorporated into a luminaire in IoT network such as in FIG. 1, or with intention to service multiple use cases and potentially become the backhaul for all connected applications in a deployment environment. In some embodiments, a system for implementing or initiating an interference mitigating protocol in the mesh network is disclosed. In some embodiments, the system comprises at least one network server connected with a gateway where nodes of the system utilize at least one tunneling network routing protocol. In some embodiments, a tunneling network protocol may be initiated by knowing or determining a best path/route through a plurality of nodes on the network (e.g., a mesh network). In some embodiments, the system may be configured to receive data packets that are forwarded along the determined best/specific path via initiating a tunneling network protocol from an originator station to a target station. The system may further be configured to identify and collect path information from all nodes during normal rate/ordered sequence of receiving data packets, by measuring one or more, or combination of factors such as, time of arrival of the said data packets, time of origination of the said data packets, and the distance of the path from the originator station to the target station. In one embodiment, the system may be configured to identify a high density data packet originated from an originator station. The system may further be configured to assign a best/specific path via one or more nodes to receive high density data packets from the originator station to the target station based on the collected path information. The system may further constantly measure time of arrival of data packets/high density data packets on every nodes/links. The nodes may comprise any gateway, router, or originator/application and high density memory data packets may comprise data related to images, video streaming, or HD videos, etc.

In some embodiments, the system may be configured to generate a message across the nodes to enable/operate/activate an assigned path via specific nodes to transfer high density data packets using a dynamic tunneling protocol. The message may include a forwarding ID of a set of specific nodes using normal protocol interfaces to transfer data packets/high density data packets. In some embodiments, the message may comprise a hop by hop ID to transfer the data packets to the specific nodes. The system may be optionally configured to allow a special message to pause all activity and this special message may be applicable for wireless and light-based (VLC/DLC) mesh network systems. In some embodiments, the path/route of the message may be truncated after every hop in the implemented mesh network. For example, the path/route may be contained within a header of the message and after arriving at each destination, the header may be modified to remove the destination that was reached.

In some embodiments, when this message reaches a root application node the sending of messages at a high bandwidth may be initiated where the data packets associated with a message to be sent at the high bandwidth will be forwarded by the identified participants of the fast/best path nodes. In some embodiments, when the message reaches the root application node, specific nodes in the path will be activated and nodes other than the specific nodes to transfer the data will be placed in an inactive state until the high density data packets are received by the target station. In some embodiments, the system may be further configured to re-activate all the nodes in the meshed network once the high density data packets are received by the target station. Further, the system may maintain pre-determined best/specific path via specific nodes to receive the high density data packets at all times from one or more originator station to one or more target station. In some embodiments, except from the identified participants of the fast/best path nodes, the remaining nodes may stop sending after an allowed time with some delta constant. The participants may stop transmitting after the time allowed for them and some delta time.

Figure 7:
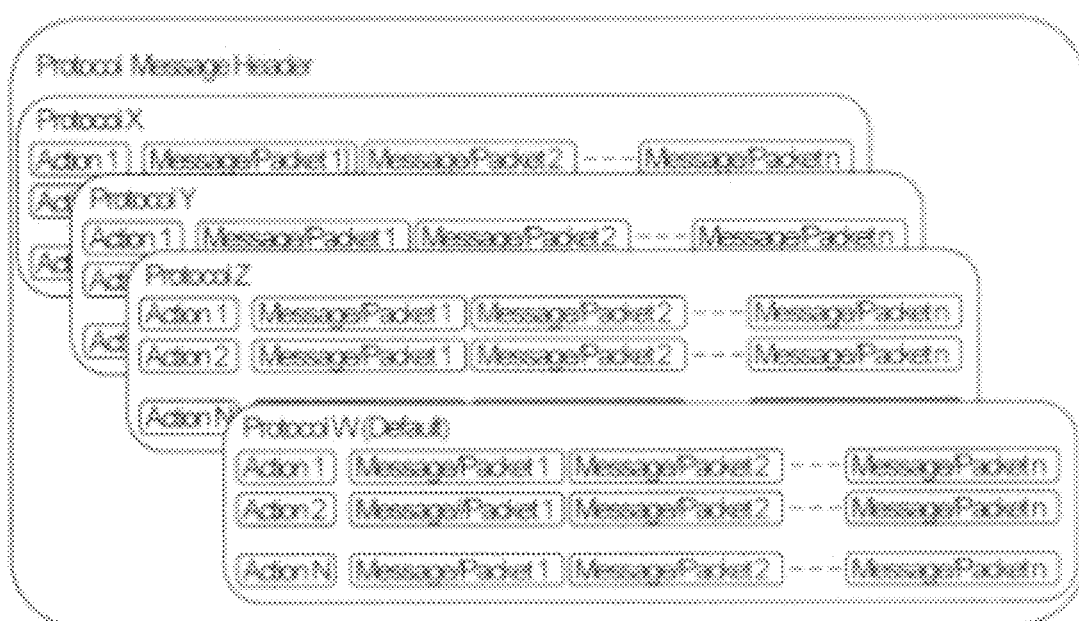
FIG. 7 illustrates an embodiment of a protocol for forwarding message list and packet structure for the gateway, according to some embodiments.

FIG. 7 illustrates an embodiment of a protocol for forwarding a message list and packet structure for the gateway. The data structure illustrated in FIG. 7 may be designed such that it is easy to traverse the protocol options and pick a correct protocol during the dynamic tunneling process. The protocol list may include any number of protocols. In some embodiments, each protocol (X, Y, Z W) may comprise directives to the gateway to setup the specific protocol interface (e.g., high bandwidth messages, sequence/serial number and other required information as dictated by the protocol standard interface). Further, each protocol may contain a set of directives/actions numbered 1 through N. The tunneling process may use these directives to take actions like sending a message or truncating the messages. According to some embodiments, each action in the list may be associated with a list comprising a node ID, sequence/serial number of the message for the forwarding nodes, memorizing the forwarding nodes, or number of messages received. In some embodiments, at least one of the protocols, without limitation, may be marked as a default protocol W. According to some embodiments, the default protocol may be the protocol to which the gateway will default into when no other protocol is activated, or during normal operations of the nodes.

Figure 8:
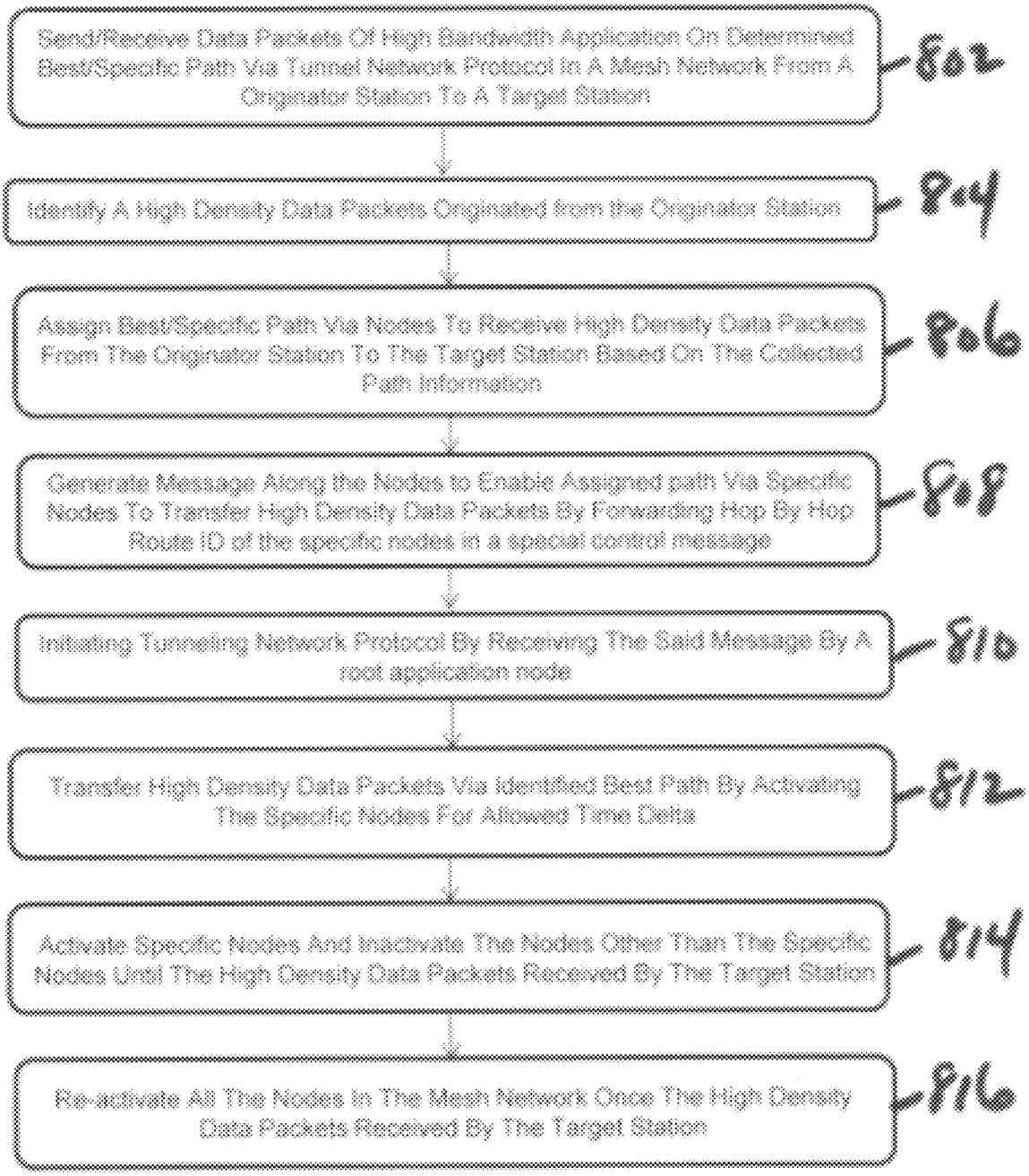
FIG. 8 is a flowchart illustrating a method for implementing or initiating dynamic interference mitigating protocol in the mesh network, according to an embodiment.

FIG. 8 is a flowchart illustrating a method 800 for implementing or initiating a dynamic interference mitigating protocol in a mesh network according to some embodiments. In step 802, data packets on a determined specific path from a source node to a target node may be received by one or more nodes on the network. In step 804, high density data packets originating from a source node may be identified along with a target node. Next, in step 806, a specific path between the source node and target node may be assigned based on information collected in step 802. Next, in step 808, a setup message may be generated and transmitted to the nodes in the assigned specific path via normal protocol interfaces. The setup message may include a forwarding ID (e.g., a hop-by-hop route ID) of the set of nodes in a special control message. In some embodiments, a message header includes an identifier associated with all the forwarding nodes and one identifier for each forwarding node. The header may also include information corresponding to a number of messages or packets from source nodes that may be sent. Further, the message header may include a sequence/serial number of packets. In some embodiments, the forwarding nodes may be configured to remember/memorize the received/forwarded data packets, wherein the fast path information may be removed from the list of the ID of the forwarding nodes. A delta time (delta T) of maintaining quiet time may consider a total number and type of packets being sent (e.g., all 10 packets/packet type) in terms of how long of a time that a node must remain quiet.

The system may further check whether a specific node in the forwarding list, where the message is truncated and the data packets are forwarded, and other non-listed nodes may remain quiet. Next, in step 810, the interference mitigating protocol may be initiated when a root/core/source application node receives the setup message. In some embodiments, the setup message is truncated after every hop. For example, the path/route may be contained within a header of the setup message and after arriving at each destination, the header may be modified to remove the destination that was reached. In step 812, high density data packets may be transferred via the identified specific path using dynamic interference mitigating protocol which activates the specific nodes and inactivates the nodes other than the specific nodes until the high density data packets are received by the target node. In step 814, the activation and inactivation may occur for an allowed time and some delta. At step 814, all the nodes in the mesh network may be re-activated once the high density data packets are received by the target station, after the allowed time and some delta.

Figure 9:
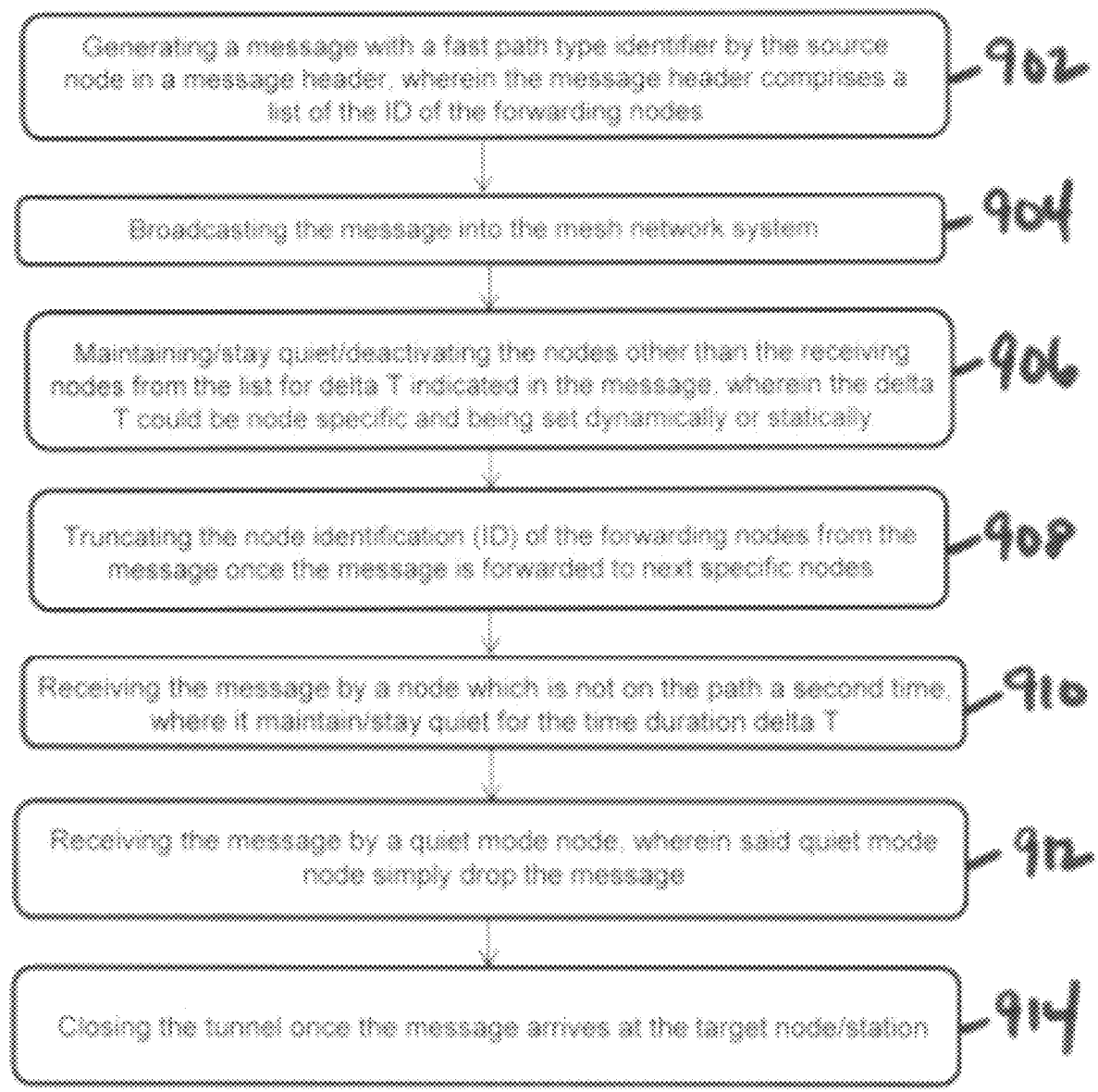
FIG. 9 is a flowchart illustrating an alternative method for implementing or initiating dynamic interference mitigating protocol in a mesh network, according to an embodiment.

FIG. 9 is a flowchart illustrating a method 900 for implementing or initiating a dynamic interference mitigating protocol in the managed mesh network according to some embodiments. In step 902, a message may be generated by the source node with a fast path type identifier in the message header which includes a list of IDs of each of the forwarding nodes. Next, at 904, the message may be broadcast into the mesh network. In step 906, the nodes (other than the nodes from the list in the message header) may be deactivated so that they remain quiet for a delta T time that indicated in the message. The delta T may be node specific and may be set dynamically or statically. Next, in step 908, the node identification (ID) of each of the forwarding nodes may be truncated from the message header once the message is forwarded to the respective specific node. This truncation step ensures that the message sent to the forwarded node will not be repetitively sent and thus, avoids an infinite loop. Next, in step 910, when the message is received by a node which is not on the path a second time, the node remains quiet for the time duration delta T. In step, 912, when the message is received by a node which is in quiet mode, that node simply drops the message. Finally, in step 914, the interference mitigating protocol is closed once the message arrives at the target node.

In some embodiments, a message comprises the following: an identifier associated with all the forwarding nodes and one identifier for each forwarding node. The message header may also comprise a number of messages/packets from source nodes (e.g., 10 packets have been sent). Further, the header may also comprise a sequence or serial number of packets. In some embodiment, the forwarding nodes may be configured to remember/memorize the received/forwarded data packets wherein fast path information may be removed from the list of the ID of the forwarding nodes. A delta time (delta T) of keeping nodes quiet usually considers all 10 packets based on a type of packet in terms of how long time that nodes must remain quiet. The system may further check whether specific nodes are in the forwarding list where the message truncates itself and forwards the data packets while other non-listed nodes remain quiet.

In some embodiments, the method further includes the steps of, initiating a tunneling network protocol by receiving the message at a source application node. In some embodiments, the message is truncated after every hop. The method may further include the step of transferring high density data packets via an identified best path using a dynamic tunneling protocol. The message may be configured to activate specific nodes and inactivate the nodes other than the specific nodes until the high density data packets received at a target station for an allowed time and some delta. The method may further include a step of re-activating all the nodes in the meshed network once the high density data packets received by the target station after an allowed time and some delta.

In some embodiments, a method for identifying or determining a best path to implement or initiate a dynamic tunneling protocol via network hardware devices in a mesh network is also disclosed. In some embodiments, the method comprises receiving data packets on a determined best path via initiating a tunneling network protocol from an originator station to a target station, identifying and collecting path information from all nodes during a normal rate/ordered sequence of receiving data packets by measuring a) time of arrival of the said data packets, b) time of origination of the said data packets, and c) the distance of the path from the originator station to the target station. The method further comprises identifying one or more high density data packets that will originate from one or more originator stations, assigning the best path to one or more nodes to receive high density data packets from the originator station to the target station based on the collected path information, and generating a message across the nodes to activate the assigned path via specific nodes to transfer high density data packets using dynamic tunneling protocol. The message may be configured to activate the specific nodes and inactivate the nodes other than the specific nodes until the high density data packets are received by the target station. Once the high density data packets are received all the nodes in the meshed network are re-activated. The pre-determined best path may be maintained via specific nodes to receive the high density data packets at all times from one or more originator stations to one or more target station. However, in some embodiments, the pre-determined best path may be altered based on determining interference (e.g., network collisions) along one or more segments in the mesh network to maintain a fastest route through the mesh network.

Referring back to FIG. 4 to FIG. 6, the system may further comprise a transmission means for transmitting data packets along a different path/route and at a different time based on the said path/route and order such that the data packets are received in the ordered sequence at the target station in the mesh network. In some embodiments, the system may further comprise transmission means (e.g, a network transmitter or transceiver) for transmitting data packets along a specified path/route and at a specified time based on the said path/route and order such that the data packets are received in the ordered sequence at the target station in the mesh network. In one embodiment, the system may further comprise storage means for storing data about a distance between individual nodes in the mesh network. In some embodiments, the system may further comprise a calculation means for calculating/measuring a time of arrival and a time of origination of the data packets along a plurality of paths/routes between the originating station and the target station in the mesh network. In some embodiments, the system may further comprise a calculation means for calculating/measuring a time of transmission of data packets along a plurality of paths/routes in an ordered/normal sequence between the originating station and the target station in the mesh network. In some embodiments, the system may further comprise a selecting means for selecting a best/specific path/routes for transferring one or more high density data packets between the originating station and the target station in the mesh network.

In some embodiments, the system may comprise a wired or wireless network or light (VLC/DLC based) communication system. In some embodiments, the system may utilize devices that communicate via a wireless network protocol such as, but not limited to, a ZIGBEE or BLUETOOTH wireless networking protocol. In some embodiments, the system may comprise a LAN device or a WLAN device. In some embodiments, the system includes two or more nodes including a coordinating node to send path/route information to other nodes on request. In some embodiments, the system may include two or more nodes including a coordinating node to activate specific path/route information to other nodes on request. In some embodiments, the system may include two or more nodes including a coordinating node to deactivate specific path/route information to other nodes on request.

In some embodiments, the system may be configured to reduce the hops/seconds by initiating a dynamic interference mitigating network protocol along the specified best path. In some embodiments, the specified or best path may be assigned by one or more source nodes in the mesh network. In some embodiments, the specified or best path may be assigned by one or more destination nodes in the mesh network in another option. In some embodiments, the specified or best path may be assigned by one or more targeting station in the mesh network in another option. In some embodiments, the specified best path/route may be assigned by one or more originating station in the mesh network in another option.

In some embodiments, the originating station and targeting station may comprise network hardware devices. In some embodiments, each path may be selected with consideration to the information on the distances between the originating station and the target station in the mesh network. In some embodiments, each route/path may be selected with consideration to the information on the number of nodes between the originating station and the target station in the mesh network. In some embodiments, the mesh network may comprise a coordinator node, wherein the coordinator node may be configured to store the path information on the distances between the originating station and the target station in the mesh network. In one embodiment, the coordinator node may be configured to store the path information on the number of nodes between the originating station and the target station in the mesh network. In some embodiments, the stored path information changes in response to messages generated by the coordinator node.

In some embodiments, the originating station/source node may not be the coordinator node, the originating station/ source nodes may request path/route information from a target station/destination nodes via one or more coordinator nodes. Thereby, the coordinator nodes may send path information to the originating station/source nodes. In some embodiments, the coordinator node may send specific path information via initiating dynamic interference mitigating protocol to receive high density data packets from applications such as video/image data to the originating station/source nodes. In some embodiments, the coordinator node may comprise any one of assigned nodes during deployment of the mesh network. In some embodiments, the coordinator node may comprise one or more gateways, one or more routers, or any of the network hardware devices.

The coordinating node may comprise a processor, such as one or more commercially available Central Processing Units (CPUs) in the form of one-chip microprocessors, coupled to a communication device configured to communicate via a communication network. The processor may communicate with a memory/storage device that stores data. The storage device may comprise any appropriate information storage device, including combinations of magnetic storage devices (e.g., a hard disk drive), optical storage devices, and/or semiconductor memory devices. The storage device may store a program and/or processing logic for controlling the processor. The processor performs instructions of the programs and thereby operates in accordance with any of the embodiments described herein. The programs may be stored in a compiled, compressed, uncompiled and/or encrypted format or a combination. The programs may furthermore include other program elements, such as an operating system, a database management system, and/or device drivers used by the processor to interface with peripheral devices.

The present disclosure, in various embodiments, configurations and aspects, include components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, include providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower", etc. are used to identify one element from another, and unless otherwise specified are not meant to refer to a particular order or number of elements.

As used in the claims, the word "comprises" and its grammatical variants, such as "including", and "having" logically also subtend and include phrases of varying and differing extent such as for example, but not limited thereto, "consisting essentially of" and "consisting of." Where necessary, ranges have been supplied, and those ranges are inclusive of all sub-ranges there between. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present disclosure.

Moreover, the description of the present disclosure has included descriptions of one or more embodiments, configurations, or aspects, and certain variations and modifications, other variations, combinations, and modifications that are within the scope of the present disclosure, as may be within the skill and knowledge of those in the art, after understanding the present disclosure. Furthermore, it is intended to obtain rights which include alternative embodiments, configurations, or aspects, to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for utilizing a dynamic interference mitigating protocol to determine and activate a first specific path in a mesh network, the system comprising:
   a first of a plurality of nodes in a mesh network to function as a source node configured to transmit a high density data packet;

a second of the plurality of nodes in the mesh network to function as a target node configured to receive a high density data packet; and a third of the plurality of nodes in the mesh network to function as a coordinator node;

wherein the system is configured for a setup message to be transmitted across the plurality of nodes to determine or implement an assigned path between the source node and the target node, wherein the setup message comprises a hop-by-hop route ID from the source node to the target node to initiate an interference mitigating protocol by each of the plurality of nodes such that incoming messages to nodes associated with the assigned path will be truncated after being received, wherein a first specific path information is stored in the coordinator node and is transmitted to the source node via the coordinator node, wherein the first specific path is determined and activated in response to a high density data packet at the source node and intended for the target node, and the high density data packet is transmitted from the source node to the target node using a dynamic tunneling protocol, wherein a control message is transmitted to the plurality of nodes, and the control message activates respective nodes along the first specific path and deactivates other nodes in the mesh network, and wherein the respective nodes along the first specific path is adjusted and the first specific path information stored in the coordinator node is changed in response to a coordination message generated by the coordinator node.

2. The system of claim 1, wherein the first specific path is determined based at least in part on path information that each node in the mesh network receives, identifies, and collects from all other nodes in the mesh network during normal bandwidth network transmissions at normal rate and in an ordered sequence of receiving data packets.

3. The system of claim 2, wherein the first path information includes one or more of a time of arrival of a data packet at a data packet receiving node, a time of origination of the data packet at a data packet originating node, and a path distance between the data packet receiving node and the data packet originating node.

4. The system of claim 1, wherein the control message instructs the activated nodes to transmit only the data packet at the source node and to drop or hold any other data packet that is received at the activated nodes, and the control message instructs the deactivated nodes to not transmit any data packets and to drop or hold any data packet that is received at the deactivated nodes.

5. The system of claim 4, wherein the control message instructs the activated nodes and the deactivated nodes to return to normal bandwidth network transmissions after a desired amount of time or upon the data packet at the source node reaching the target node.

6. The system of claim 1, wherein the control message includes a forwarding identification ID of the nodes along the first specific path.

7. The system of claim 6, wherein the forwarding ID is a hop-by-hop route ID of the nodes along the first specific path.

8. The system of claim 7, wherein a node ID of a corresponding node along the first specific path is removed from the forwarding ID when the control message is received at the corresponding node.

9. The system of claim 1, wherein the first specific path is for a first high density data packet from the source node to the target node, and a second specific path is for a second high density data packet from the source node to the target node, and the first path and the second path are dynamically determined and activated for receiving the first high density data packet and the second high density data packet in an ordered sequence at the target node.

10. A method for utilizing a dynamic interference mitigating protocol to determine and activate a first specific path in a mesh network, the method comprising:

identifying a high density data packet to be transmitted from a first of a plurality of nodes that functions as a source node configured to transmit a high density data packet to a second of the plurality of nodes that functions as a target node configured to receive a high density data packet in a mesh network;

sending a setup message to be transmitted across the plurality of nodes to determine or implement an assigned path between the source node and the target node, wherein the setup message comprises a hop-by-hop route ID from the source node to the target node to initiate an interference mitigating protocol by each of the plurality of nodes such that incoming messages to nodes associated with the assigned path will be truncated after being received, transmitting a first specific path information to the source node via a third of a plurality of nodes that functions as a coordinator node, wherein the first specific path information is stored in the coordinator node;

wherein the first specific path is determined and activated in response to a high density data packet at the source node and intended for the target node, and the high density data packet is transmitted from the source node to the target node via the first specific path using a dynamic tunneling protocol, transmitting a control message to the plurality of nodes;

wherein the control message includes a hop-by-hop route identification (ID) through the plurality of nodes, the method further comprising initiating a tunneling network protocol that indicates messages will be truncated after every hop through the mesh network after receiving the control message at an activated node;

activating, by the control message, respective nodes along the first specific path;

deactivating other nodes in the mesh network; and adjusting the respective nodes along the first specific path and changing the first specific path information stored in the coordinator node in response to a coordination message generated by the coordinator node, further comprising instructing the activated nodes and the deactivated nodes to return a state of normal bandwidth network transmissions after a particular time or upon the high density data packets reaching the target node.

11. The method of claim 10, further comprising changing the first specific path for a first high density data packet from the source node to the target node to a second specific path for a second high density data packet from the source node to the target node, wherein the first path and the second path are dynamically determined and activated for receiving the first high density data packet and the second high density data packet in an ordered sequence at the target node.

12. A method for utilizing a dynamic interference mitigating protocol to determine and activate a fast path in a mesh network, the method comprising:
generating a message, via a processor, the message including a fast path identifier associated with a source node configured to transmit a high density data packet in a mesh network comprising a plurality of nodes,
wherein the fast path identifier resides in a message header that comprises a list of forwarding nodes in the mesh network;
sending a setup message to be transmitted across the plurality of nodes to determine or implement an assigned path between the source node and a target node,
wherein the setup message comprises a hop-by-hop route ID from the source node and the target node to initiate an interference mitigating protocol by each of the plurality of nodes such that incoming messages to nodes associated with the assigned path will be truncated after being received,
broadcasting the message through the mesh network;
deactivating each of the plurality of nodes other than the source node, a receiving node, and the forwarding nodes in the message header;
truncating the list of the forwarding nodes from the message once the message is forwarded to a next forwarding node in the mesh network; and
generating another message, via a processor in a coordinator node, to adjust the list of forwarding nodes in the mesh network,
wherein the adjusted list of forwarding nodes in the mesh network is stored in the coordinator node, and
further comprising transferring high density data packets via the fast path using the dynamic interference mitigating protocol, and
further comprising instructing the forwarding nodes and the deactivated nodes to return a state of normal bandwidth network transmissions after a particular time or upon the high density data packets reaching the receiving node.

13. The method of claim 12, further comprising receiving the message at a deactivated node; and dropping the message at the deactivated node.

14. The method of claim 12, wherein deactivating includes instructing a node to receive messages but to not transmit messages.

* * * * *